May 12, 1942.  W. E. HORROCKS  2,282,360
LOCK WASHER FOR RETAINING PINS IN COUPLINGS
Filed April 23, 1940
FIG. 1
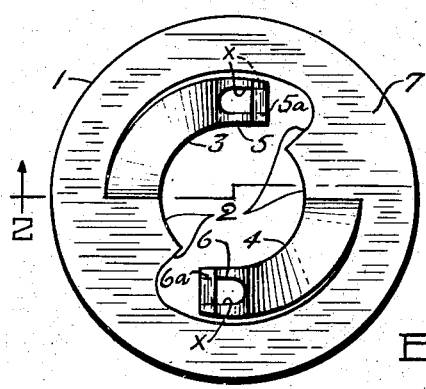
FIG. 3
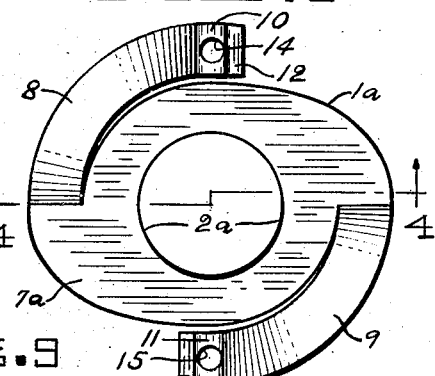
FIG. 2
FIG. 9
FIG. 4
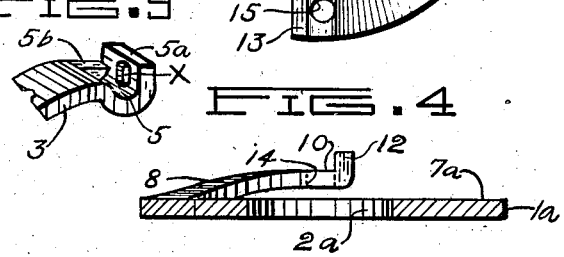
FIG. 5
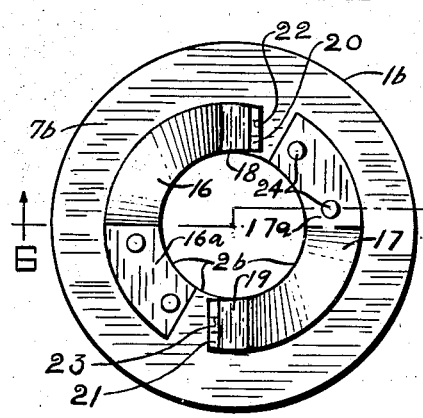
FIG. 7
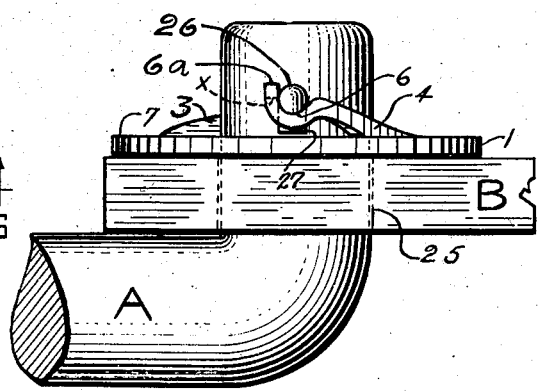
FIG. 6
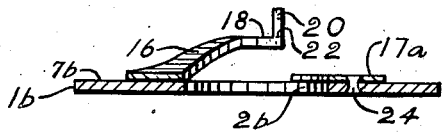
FIG. 8
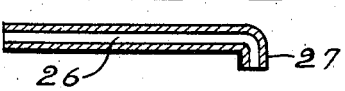
WITNESSES
Geo H Moore
Robert F Stein
INVENTOR
Walter E. Horrocks Patented May 12, 1942

2,282,360

UNITED STATES PATENT OFFICE 2,282,360

LOCK WASHER FOR RETAINING PINS IN COUPLINGS

Walter E. Horrocks, Lakewood, Ohio

Application April 23, 1940, Serial No. 331,197

21 Claims. (Cl. 85—5)

My invention relates generally to washers, and more particularly to resilient lock washers provided with novel means for coupling with retaining pins and the like.

One of the objects of the present invention is to provide a lock washer having resilient means for providing an effective coupling for retaining pins which are used in the coupling rods and pins of active coupling mechanisms.

The present invention contemplates a washer as set forth above in which the resilient or spring pressure of the washer is applied and utilized after the free retaining pins are inserted in place.

More specifically, the invention contemplates a lock washer for use with couplings for taking up lateral play of the coupling elements that are used with an active coupling mechanism and secured thereto by retaining pins inserted through one of the elements.

The foregoing and numerous other objects and advantages will be more apparent from the following detailed description when considered in connection with the accompanying drawing and the specifications pertaining thereto.

In present practice whereas a coupling rod or pin is inserted through a hole which is provided in a co-acting element to form a coupling, and the coupling rod or pin is required to be maintained and function within the hole without any lateral shifting in the hole of the element to which it is applied, it is common practice to provide a small hole through the coupling rod or pin, usually near the end thereof, for the installation and use of a free retaining pin or the like, therethrough, in order that the coupling rod or pin does not slip through the hole provided in the element of the coupling to which it is applied so that the entire coupling mechanism is maintained in assembled working formation.

For various and obvious reasons it is customary to install a standard flat washer under the retaining pin, which is used as a filler, such as to take up any irregularities in the location of the small hole which is provided in the element for receiving the retaining pin, and also so as to prevent any excessive movement of the coupling rod or pin in the hole provided in the element of the coupling in which the coupling rod or pin is to be used.

Couplings that are constructed with elements of this nature are used in the brake mechanism and other active mechanisms that are used extensively in connection with automobiles, and in similar active mechanisms using like couplings which are used for various other appliances.

When couplings of this nature are to be used in automobiles, or are to be used in other installations that are subjected to vibration, it is obvious that the coupling rod or pin used in the coupling must be secured firmly so as to prevent any excessive wear on the co-acting parts, and also so that there will not be any objectionable rattle in the coupling such as is caused by excessive unrestrained lateral movement of the coupling rod or pin when working with co-acting coupling elements.

With present practice as outlined above it is customary to install a suitable flat conventional type washer of the proper thickness if it is available, or in lieu thereof, a multiple number of flat shim washers are used to obtain the desired thickness to restrain the lateral movement of the coupling rods or pins.

If a standard helical spring is used for this purpose some means must be employed or devised to compress and hold one side of the helical spring below the small hole that is provided in the coupling rod or pin to receive the retaining pin until the retaining pin is installed through the small hole and then the helical spring may be allowed to expand and exert its working pressure against the retaining pin, otherwise it is impossible to install a standard helical spring to serve this purpose.

Couplings that are to be used in automobile brake mechanisms and the like require that the assemblage of the coupling is made in limited and cramped spaces in which the compression requirements as noted above will negative the use of any standard helical spring to serve as outlined.

In order to overcome these difficulties I have provided a washer having resilient parts so arranged to eliminate the use of a multiple number of shim washers or the conventional type of standard washers that can be applied around a coupling rod or pin which is used in a coupling, and in which the retaining pin can be inserted through the small hole that is provided in the coupling rod or pin without the necessity of compressing the resilient parts, and after the retaining pin is inserted through the small hole provided in the coupling rod or pin the washer can then be rotated about the element to which it is applied which causes a working spring tension pressure to be applied and maintained upon the retaining pin at all times, and the washer is also thereby firmly secured and positively anchored to the ends of the retaining pin at all times, which prevents of any rotation of the washer around the coupling rod or pin, or any lateral shift of these elements in the hole of the co-acting coupling element, which thereby eliminates any rattle of the assembled coupling which may originate from this source when subjected to vibrations, such as when used in automobiles, in which couplings of this nature are subjected to continuous road shocks that impair the efficiency of the coupling mechanisms.

Fig. 1 is a plan view of a spring washer having curvilineal portions disposed within an irregular-shaped aperture.

Fig. 2 is a cross section taken substantially on the line 2—2 of Fig. 1 showing the retaining pin locking means.

Fig. 3 is a plan view of an alternative type of spring washer having curvilineal portions disposed about the outer edge of the washer.

Fig. 4 is a cross section taken substantially on the line 4—4 of Fig. 3 showing the retaining pin anchorage means.

Fig. 5 is a plan view of a washer in which the complementary resilient parts are disposed and secured about the center aperture of the washer.

Fig. 6 is a cross section taken substantially on the line 6—6 of Fig. 5 showing the retaining pin securing means.

Fig. 7 is a side elevation showing the washer shown in Fig. 1 practically applied in a coupling mechanism.

Fig. 8 is a view of a round retaining pin having a bent portion formed on one end of the pin.

Fig. 9 is a fragmentary perspective view showing an alternative type of retaining pin locking and retaining means that is applicable to any of the washers shown, which are more preferable to facilitate of rapid installations.

Referring now to the drawing more in detail, at Fig. 1 and Fig. 2 is shown a washer having a base portion 1 with a center aperture 2 provided therethrough and curvilineal portions 3 and 4 which have semi-circular depressions 5 and 6 formed therein which are disposed opposite to each other substantially on the center diametrical line of the washer, the portions 3 and 4 of the washer are bent outwardly from the base portion in a general helical or compound curvature so that the semi-circular channeled depressions 5 and 6 are disposed substantially above the top side 7 of the base portion 1 as shown in Fig. 2, with the ends 5a and 6a extended to form stops which prevents the retaining pin from sliding off over the ends of the semi-circular channeled depressions 5 and 6 and to provide means X for anchoring a retaining pin thereto.

Fig. 3 and Fig. 4 show a washer having a base portion 1a with a round center aperture 2a provided therethrough, and curvilineal portions 3 and 9 which have small flat portions 10 and 11, and portions which are bent substantially at right angles to the small flat portions 10 and 11 forming stops or lugs 12 and 13 which prevent the retaining pin from sliding off over the ends of the flat portions 10 and 11. The portions 8 and 9 of the washer are bent outwardly from the base portion in a general helical or compound curvature so that the small flat portions 10 and 11 are disposed substantially parallel above the top side 7a of the base portion 1a as shown in Fig. 4. In the small flat portions 10 and 11 holes as are indicated at 14 and 15 are provided which are to be used to receive and anchor the bent end 27 of a retaining pin as shown in Fig. 8. It is to be noted however that these holes can be placed if so desired, through the stops or lugs 12 and 13 for receiving the bent end 27 of the retaining pin as shown in Fig. 8, as this feature is optional to suit the different uses to which the washer may be applied.

Fig. 5 and Fig. 6 show a washer having a separate base portion 1b with a round center aperture 2b provided therethrough and separate curvilineal elements 16 and 17 which have flat base portions 16a and 17a and also small flat portions 18 and 19, and portions which are bent substantially at right angles to the small flat portions 18 and 19 forming stops or lugs 20 and 21. In the stops or lugs 20 and 21 holes as indicated at 22 and 23 are provided which are to be used to receive and secure the bent end 27 of a retaining pin as shown in Fig. 8. The separate elements 16 and 17 are securely fastened to the separate base portion 1b with rivets 24 as shown, or any other suitable and practical means may be employed for unifying these elements together. The separate elements 16 and 17 are bent outwardly in a general helical or compound contour so that the small flat portions 18 and 19 are disposed substantially above the top side 7b of the base portion 1b and the top sides of the flat base portions 16a and 17a as shown in Fig. 6. It is also to be noted in this instance that the small holes 22 and 23 can be placed in the small flat portions 18 and 19 if so desired.

Fig. 7 shows a complete practical assembly of an active type of coupling which is extensively used in the brake mechanisms for automobiles and the like in which the washer that is shown in Fig. 1 is utilized in which B represents a first element having a hole 25 provided therethrough, and a rod A represents a second element which is bent on one end and inserted through the bore hole 25 of the bar B which provides a working bearing for rotary movement of the rod A. The washer is then placed over the end of the rod A so that the flat portions of the washer in the base portion that are disposed between the helical shaped portions 3 and 4 will be located under the small hole which is provided in the rod A to receive the retaining pin. The retaining pin 26 which is shown in Fig. 8 is then inserted through the small hole which is provided in the rod A for this purpose and the washer is then rotated about the rod A by any convenient means, such as by applying thumb and finger pressure against the ends of the raised helical portions, or by lightly striking the ends of the helical portions with a hammer or other convenient hand tool. In rotating the washer about the rod A as described, the resilient helical shaped portions 3 and 4 are caused to pass under the projecting ends of the retaining pin 26 and impose a resilient pressure upon the ends of the retaining pin 26. The washer is to be rotated about the rod A far enough to allow of the retaining pin 26 to snap into and seat in the semi-circular channeled depressions 5 and 6 which prevents the washer from turning loosely around the rod A and the bent end 27 is also snapped into the hole X which prevents of any longitudinal shift of the retaining element 26. The retaining pin 26 is also made long enough so that as when the bent end 27 is adjacent to the outer side of either of the ends 5a or 6a, or as when the bent end 27 is snapped into the hole X as the case may be, allows of both ends or one end as the case may be of the pin 26 to be conveniently bent around the complementary outer sides of the ends 5a or 6a as the case may be, which will anchor the retaining pin to the washer 1 so that the washer will always rotate freely and unrestrictively with the rod A and also prevent the retaining pin from escaping from the small hole in the rod A. The resilient helical portions 3 and 4 being disposed against the pin 26 and the base 7 of the washer being disposed against the flat bar B maintains a constant pressure against these elements regardless of any changeable rotary movement of either the rod A or the bar B relative to each other which prevents any lateral shift of the rod A in the hole 25 which is provided in the flat bar B. It is to be especially noted however that the type of coupling assembly disclosed is only one specific type to illustrate the applicability of the invention, but it is intended that the invention is to be used with other types of assemblies, in which a multiple number of first elements B or the like may be coupled to the second element A, and, such as using a clevis for the first element B to straddle any additional elements B and using a headed coupling pin or other element for the second element in lieu of the rod element shown at A, and a cotter pin or different pin than shown, may be used for the retaining pin if it is so desired.

Fig. 9 shows a type of retaining pin anchorage and retaining means in which a header or end stop 5b is formed at ne end of the semi-circular channeled depressions 5 in the resilient member 3 which is shown in Fig. 1 and Fig. 2. This feature allows of the using of straight retaining pins instead of the retaining pin as shown in Fig. 8. When a straight retaining pin is snapped into the depressions 5 the additional end stop 5b will prevent the retaining pin from any longitudinal movement and escaping from the element to which the retaining pin is applied. It is to be further noted however that this type of pin retaining and anchorage means, or combinations of the means that are shown, are intended to be used with, and can be formed on the ends of the resilient members of any of the washers as are shown in any of the figures, in lieu of the anchorage means that are shown in the figures for this purpose. The pin retaining an anchorage means described, denotes the means 5, 5a, and 5b combined, or a combination of 5, 5a, and X, or the means 5 and 5b, as being intended to be used and formed on the ends of the complementary members.

It is to be further noted however that the stops 5a and 6a can also be provided with holes therethrough shown at X for receiving the bent end 27 of the pin 26 shown in Fig. 8, the holes in this case preferably being elongated vertically for the proper reception of the retaining pin therethrough to allow of the pin to properly seat in the semi-circular channeled depressions and be locked therein.

The washers that are shown in Figs. 3 and 4 and Figs. 5 and 6 are installed in practically the same way as described above for installing the washer shown in Figs. 1 and 2, with the exception that the bent end 27 of the pin 26 is disposed in the hole 14 or 15 provided in the washer shown in Fig. 3 and Fig. 4, which provides an anchorae means and also prevents the retaining pin from escaping from the hole provided in the end of the rod A, or the bent portion 27 of the pin 26 is disposed in the hole 22 or 23 provided in the washer shown in Figs. 5 and 6, in which case the bent end 27 of the pin 26 is clinched around the stops or lugs 20 or 21 as the case may be, which provides an anchorage means and prevents the retaining pin from escaping from the hole provided in the rod A.

It is to be noted that the helical resilient portions 8 and 9 in Fig. 3 and also Fig. 4 can be depressed in such a manner that the top side of the small flat portions 10 and 11 will register with the top side 7a of the base portion 1a. This feature allows of the resilient washer to be utiilzed in lieu of a conventional washer of the same thickness, such as when the bottom side of the retaining pin 26 lies substantially in the same plane as the top side 7a of the base portion 1a, and if due to any variations in the location of the small hole in the end of the rod A, no multiple number of shim washers will be required to take up the variations or prevent lateral shift of the rod A in the bore hole into which it is intended to operate.

It is to be further noted that the helical resilient elements 16 and 17 shown in Fig. 5 and Fig. 6 can be depressed in such a manner that the top side of the small flat portions 18 and 19 will register with the top sides of the base portions 16a and 17a which allows of the same features to be utilized as explained in the preceding paragraph.

The washers that are shown in the Figures 1, 2, 5 and 6 are the preferred form for using with light gage metal while the washers that are shown in Figures 3 and 4 are the more preferred form for using with the heavier gage metals although the washers as they are shown in any of the figures are in no way limited to this combination, as all may be made by stampings from either light or heavy gage stock to meet the various requirements. The different stop and anchorage means shown on the ends of the resilient curvilineal parts are intended to be incorporated with each type of washer to accommodate different individual specific requirements.

The washers shown in the drawing are of the type that are to be rotated in a counterclockwise motion, but it is intended that they are also to be formed so as to rotate in a clock-wise motion, the washers also show that the curvilineal parts are disposed oppositely to each other which allows of making these parts as long as possible which is preferable in small washers, but it is to be noted, and intended, that the curvilineal parts may be arranged in pairs oppositely disposed, with their points of origination being oppositely disposed, and with a flat portion of the washer being disposed between the points where the curvilineal parts originate from the base of the washer, which will allow a retaining pin to be inserted between the oppositely disposed pairs of curvilineal parts, and also allow of the washer to be rotated either left-hand or right-hand, but the results will remain the same as is diclosed in the figures that are shown on the drawing.

From the foregoing description it will be apparent that my invention provides a washer which is particularly adapted for use in various types of active coupling mechanisms whereas the coupling assembly is held together with free retaining pins, and is adaptable to use in lieu of the conventional type washer, or in lieu of a multiple number of conventional shim washers. The free retaining pins can be easily installed in the coupling elements in cramped spaces without the necessity of providing any auxiliary means for compressing the washer, and the working pressure of the washer can be easily and practically applied to the coupling, which will tend to obviate any lateral movement of the coupling elements and also counteract any excessive wear due to any lateral shifting of the coupling rod or pin in their co-acting coupling elements, regardless of any variations in the location of the small hole provided in the element that is to receive the retaining pin, as the compressible means that are provided in the curvilineal or complementary parts of the washer are flexible and adjustable to anticipate this need.

The retaining pins or elements being positively locked to the washer against rotary and longitudinal movement allows of the washer to rotate or shift with the coupling element or the coupling pin so that the base portion of the washer presents a large working bearing surface in lieu of the small line bearing working surfaces of retaining pins when used in combination with a conventional type of washer which allows of the unlocked retaining pin to rotate upon the washer, but it is understood and intended that slight modifications can be made, such as constructing the curvilineal members in other contours to provide complementary members, and elongating the depressions or increasing the width of the small flat portions. It is also to be noted that the depressions need not be confined to the preferred semi-circular contours shown but may be formed to other contours including V or channel shapes, or U shapes, in order to receive the retaining pin.

From the foregoing description specific embodiments of the invention have been illustrated and described, but it will be understood that various alterations in the details of construction can be made without departing from the scope of the invention and I reserve the right to the use of various metals or alloys for constructing the washers and making slight changes, changes without departing from the scope of the appended claims, and having described my invention what I claim and desire to secure by Letters Patent is:

1. A resilient lock washer for securing retaining pins in couplings, comprising a body having an irregular-shaped aperture therethrough for dividing portions of the said body into oppositely disposed curvilineal parts, said parts formed in a general helical contour extending laterally from the said body, oppositely disposed flat portions of the said body lying in the space which extends between and beyond the said parts, channeled depressions formed on the ends of the said curvilineal parts with their termini extending substantially above the said depressions, and locking means provided therewith for restraining longitudinal movement of retaining elements therein.

2. A resilient lock washer for securing retaining pins in couplings, comprising a body having an irregular-shaped aperture therethrough for dividing portions of the said body into oppositely disposed curvilineal parts, said parts formed in a general helical contour extending laterally from the said body, oppositely disposed flat portions of the said body lying in the space which extends between and beyond the said parts, and depressions formed on the ends of the said curvilineal parts with their termini extending substantially above the said depressions provided with holes therethrough extending into the depressions forming means for locking a retaining pin in the said depressions.

3. A resilient lock washer for securing retaining pins in couplings, comprising a body having a round center aperture therethrough and an irregular-shaped contour dividing portions of the said body into diametrically disposed curvilineal parts, oppositely disposed flat portions of the said body lying between the said parts, said parts formed in a general helical contour substantially parallel about the said aperture extending laterally from the said body, flat portions formed at the ends of the said curvilineal parts substantially parallel to the plane of the said body with their termini bent at right angles to the said flat portions, and anchorage means provided therewith to restrain longitudinal movement of retaining elements thereon.

4. A resilient lock washer for securing retaining pins in couplings, comprising a body having a round center aperture therethrough and an irregular-shaped contour dividing portions of the said body into diametrically disposed curvilineal parts, oppositely disposed flat portions of the said body lying between the said parts, said parts formed in a general helical contour substantially parallel about the said aperture extending laterally from the said body, flat portions formed at the ends of the said curvilineal parts substantially parallel to the plane of the said body with their termini bent at right angles to the said flat portions, and said flat portions provided with holes therethrough forming means for securing a free retaining pin thereon.

5. A lock washer for securing retaining pins in couplings, comprising an annular body having a round center aperture therethrough, oppositely disposed resilient curvilineal members secured to the said body, oppositely disposed flat portions of the said body lying in the gap between the said members, said members formed in a general helical contour about the said aperture extending laterally from the said body, flat portions formed at the ends of the said curvilineal members substantially parallel to the plane of the said body with their termini bent at right angles to the said flat portions, and anchorage means provided therewith for restraining longitudinal movement of retaining elements thereon.

6. A lock washer for securing retaining pins in couplings, comprising an annular body having a round center aperture therethrough, oppositely disposed resilient curvilineal members secured to the said body, oppositely disposed flat portions of the said body lying in the gap between the said members, said members formed in a general helical contour about the said aperture extending laterally from the said body, and flat portions formed at the ends of the said curvilineal members substantially parallel to the plane of the said body with their termini bent at right angles to the said flat portions provided with holes therethrough forming means for positively securing a free retaining pin thereon.

7. A lock washer for securing retaining pins in couplings, comprising a free body provided with oppositely disposed resilient complementary members, locking means for holding a retaining pin against longitudinal movement provided at the termini of the said members, oppositely disposed flat portions of the body lying in the space which extends between the said members, and said members formed in a general helical or compound contour extending laterally from the said body providing an adjustable means for the positive coupling of free retaining pins that are located at various positions in a coupling element.

8. A resilient lock washer for securing retaining pins in couplings, comprising a free body having an irregular-shaped aperture therethrough for dividing portions of the said body into oppositely disposed complementary parts, channeled depressions provided with positive locking means for securing a free retaining pin against longitudinal movement provided at the termini of the said parts, the said parts formed in a general helical or compound contour extending laterally from the said body, and oppositely disposed flat portions of the said body lying in the space which extends between and beyond the said parts providing unobstructed means for inserting a free retaining pin in a coupling element at points substantially below the said locking means.

9. A resilient lock washer for securing retaining pins in couplings, comprising a free body having a round center aperture therethrough and having an irregular-shaped contour dividing portions of the said body into diametrically disposed complementary parts, positive locking means for securing a free retaining pin against longitudinal movement provided at the termini of the said parts, the said parts formed in a general helical or compound contour substantially parallel about the said aperture extending laterally from the said body, and oppositely disposed flat portions of the said body lying between the said parts providing unobstructed means for inserting a free retaining pin in a coupling element at points substantially below the said locking means.

10. A lock washer for securing retaining pins in couplings, comprising a free annular body having a round center aperture therethrough, oppositely disposed resilient complementary members secured to the said body, positive locking means for securing a free retaining pin against longitudinal movement provided at the termini of the said members, the said members formed in a general helical or compound contour substantially about the said aperture extending laterally from the said body, and oppositely disposed flat portions of the said body lying in the gap between the said parts providing unobstructed means for inserting a free retaining pin in a coupling element at points substantially below the said locking means.

11. A lock washer for securing retaining pins in couplings, comprising a free body provided with oppositely disposed resilient complementary members, anchorage means for securing a free retaining pin against longitudinal movement provided at the termini of the said members, the said members formed in a general helical or compound contour extending laterally from the said body, and oppositely disposed flat portions of the said body lying in the gap between the said members providing unobstructed means for inserting a free retaining pin in a coupling element at points substantially below the said anchorage means.

12. In combination, a rotative coupling mechanism having a first element provided with an aperture therethrough, a second element protruding through the said aperture provided with a hole therethrough, a retaining element freely protruding through the hole in the said second element, a lock washer as described in claim 8 disposed around the said second element adjacent to the said first element, laterally disposed complementary portions of the said washer initially extending axially beyond protruding ends of the said retaining element, and the washer initially rotatable about the said second element for compressing the said complementary portions under the said retaining element with the termini of the said complementary portions provided with means adapted for positively securing the retaining element thereto and rotating the washer with the said second element.

13. In combination, a rotative coupling mechanism having a first element provided with an aperture therethrough, a second element protruding through the said aperture provided with a hole for inserting a retaining pin therethrough, a lock washer as described in claim 9 disposed around the said second element adjacent to the said first element, laterally disposed complementary portions of the washer initially extending axially beyond the hole in the said second element, a retaining element freely projecting through the hole in the said second element, the said complementary portions initially rotatable and compressible under the projecting ends of the said retaining element when rotated about the said second element, and provided with means at their termini adapted for positively securing the retaining element thereto and rotating the washer with the said second element.

14. In combination, a rotative coupling mechanism having a first element provided with an aperture therethrough, a second element protruding through the said aperture provided with a hole therethrough, a retaining element freely protruding through the hole in the said second element, a lock washer as described in claim 10 disposed around the said second element adjacent to the said first element, laterally disposed resilient complementary members of the washer initially extending axially beyond protruding ends of the said retaining element, the washer initially rotatable about the said second element for compressing the said complementary members under the said retaining element, and the said complementary members provided with means at their termini for positively securing the retaining element thereto and rotating the washer with the said second element.

15. In combination, a rotative coupling mechanism having a first element provided with an aperture therethrough, a second element protruding through the said aperture provided with a hole for inserting a retaining pin therethrough, a lock washer as described in claim 11 disposed around the said second element adjacent to the said first element, laterally disposed resilient complementary members of the washer initially extending axially beyond the hole in the said second element, a retaining element freely projecting through the hole in the said second element, the said complementary members initially rotatable and compressible under the projecting ends of the said retaining element when rotated about the said second element, and provided with means at their termini for positively securing the retaining element thereto and rotating the washer with the said second element.

16. As an article of manufacture for coupling retaining pins and the like, a lock washer comprising a body structure of springy material having an irregular-shaped aperture therethrough for dividing portions of the said structure into oppositely disposed complementary parts, said parts formed in a general helical or compound contour extending laterally from the said body structure, oppositely disposed flat portions of the said structure lying substantially in a space which extends between and beyond the said complementary parts providing an unobstructed gap between the said parts, and channeled depressions provided with means for holding retaining pins against longitudinal displacement formed on the ends of the said complementary parts whereby a retaining element is to be coupled thereto.

17. As an article of manufacture for coupling retaining pins and the like, a lock washer comprising a body structure of springy material having a round center aperture therethrough and having an irregular-shaped contour dividing portions of the said structure into diametrically disposed complementary parts, said parts formed in a general helical or compound contour extending laterally from the said body structure, oppositely disposed flat portions of the said structure lying substantially between the said complementary parts providing an unobstructed gap between the said parts, and locking means for holding retaining elements against longitudinal movement provided at the ends of the said complementary parts whereby a retaining element is to be secured thereto.

18. As an article of manufacture for coupling retaining pins and the like, a lock washer comprising a structure having a base and oppositely disposed resilient complementary parts, said parts formed in a general helical or compound contour extending laterally from the said base, oppositely disposed flat portions of the said base lying substantially in the space which extends between and beyond the said complementary parts providing an unobstructed gap between the said parts, and locking means for securing retaining elements against longitudinal movement provided at the ends of the said complementary parts whereby a retaining element is to be secured thereto.

19. As an article of manufacture for coupling retaining pins and the like, a lock washer comprising a structure having a base provided with oppositely disposed resilient complementary members, said members formed in a general helical or compound contour extending laterally from the said base, oppositely disposed portions of the said base lying substantially in the space between the said complementary members providing an unobstructed gap between the said complementary members for installing a retaining element between the said members, and the ends of the said complementary members provided with locking means for holding retaining pins against longitudinal movement, said locking means being provided substantially as described for maintaining and securing a retaining element thereto.

20. A lock washer comprising a free body, laterally disposed complementary resilient elements having an unobstructed gap therebetween, fixed to the said body, and holding means provided at the termini of the resilient elements to couple retaining elements therewith against longitudinal displacement.

21. In a rotative coupling mechanism, the combination of a first element provided with an aperture therethrough and a second element protruding through the said aperture with a hole therethrough, a retaining element protruding through the hole in the said second element, and a lock washer as described in claim 20 disposed around the said second element adjacent to the said first element, laterally disposed complementary portions of the washer initially extending axially beyond protruding ends of the said retaining element, the washer initially rotatable about the said second element for compressing the said complementary portions under the retaining element, and the said complementary portions provided with means at their termini for holding the retaining element thereto and rotating the washer with the said second element.

WALTER E. HORROCKS.